United States Patent
Böhmer et al.

(10) Patent No.: US 7,895,722 B2
(45) Date of Patent: Mar. 1, 2011

(54) METHOD FOR ASSEMBLING A CRASH-ACTIVE HEAD SUPPORT

(75) Inventors: Michael Böhmer, Rockenhausen (DE); Daniel Hippel, Winnweiler (DE); Martin Reischmann, Höhfröschen (DE); Bernhard Müller, Waldmohr (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 589 days.

(21) Appl. No.: 11/897,399

(22) Filed: Aug. 30, 2007

(65) Prior Publication Data
US 2008/0014029 A1 Jan. 17, 2008

Related U.S. Application Data

(63) Continuation of application No. PCT/EP2006/000836, filed on Feb. 1, 2006.

(30) Foreign Application Priority Data
Mar. 1, 2005 (DE) ........................ 10 2005 009 128

(51) Int. Cl.
*B68G 7/00* (2006.01)
*B21D 53/88* (2006.01)
*B60N 2/427* (2006.01)
(52) U.S. Cl. ........................ 29/91.1; 29/91; 29/897.2; 297/216.12
(58) Field of Classification Search ................. 29/897.2, 29/91, 91.1; 297/216.12, 216.11, 220
See application file for complete search history.

(56) References Cited
U.S. PATENT DOCUMENTS

| | | | |
|---|---|---|---|
| 5,004,572 A | 4/1991 | Kurimoto | |
| 6,213,548 B1 * | 4/2001 | Van Wynsberghe et al. | . 297/391 |
| 6,223,436 B1 * | 5/2001 | Dudash et al. | ............. 29/897.2 |
| 6,623,073 B2 | 9/2003 | Schafer et al. | |
| 6,688,697 B2 * | 2/2004 | Baumann et al. | ....... 297/216.12 |
| 7,048,336 B2 * | 5/2006 | Mawbey et al. | ............. 297/408 |
| 7,070,235 B2 | 7/2006 | Schilling et al. | |
| 7,108,320 B2 | 9/2006 | Schafer et al. | |
| 7,195,313 B2 | 3/2007 | Hippel et al. | |
| 2001/0040396 A1 | 11/2001 | Kreuels et al. | |
| 2002/0043858 A1 * | 4/2002 | Svantesson et al. | ......... 297/391 |
| 2006/0214492 A1 | 9/2006 | Hassler et al. | |
| 2006/0220434 A1 | 10/2006 | Schulz et al. | |
| 2007/0096516 A1 | 5/2007 | Heeg et al. | |
| 2007/0152482 A1 | 7/2007 | Schilling et al. | |

FOREIGN PATENT DOCUMENTS

DE 38 39 066 A1 6/1989

(Continued)

*Primary Examiner*—David P Bryant
*Assistant Examiner*—Sarang Afzali
(74) *Attorney, Agent, or Firm*—Womble Carlyle Sandridge & Rice, PLLC

(57) ABSTRACT

The invention relates to a method for assembling a crash-active head support (1) of a vehicle seat, whereby the structure of the head support (1) is initially assembled from a rear and a front bearing shell and is then upholstered. The rear bearing shell (5) and the front bearing shell (11) are equipped with components (3, 15, 25, 31) and then the equipped bearing shells (5, 11) are rigidly connected together. An impact element (55) is coupled thereto thus forming a quadruple joint.

15 Claims, 3 Drawing Sheets

FOREIGN PATENT DOCUMENTS

| | | |
|---|---|---|
| DE | 20 2004 009 445 U1 | 9/2004 |
| EP | 1 122 122 A1 | 8/2001 |
| EP | 1 502 809 A2 | 2/2005 |
| GB | 2 240 920 A | 8/1991 |
| GB | 2 316 862 A | 3/1998 |

* cited by examiner

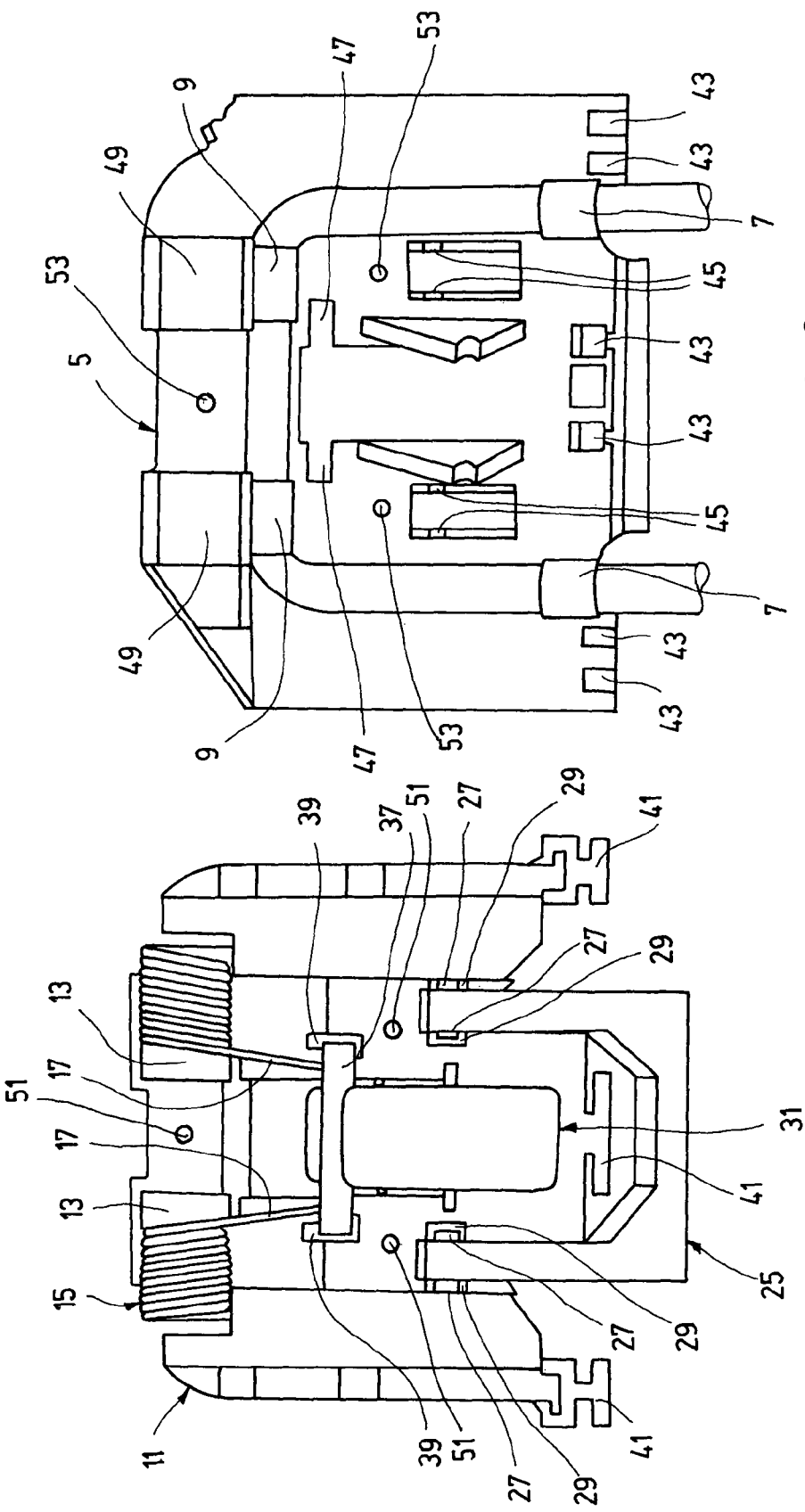

METHOD FOR ASSEMBLING A CRASH-ACTIVE HEAD SUPPORT

CROSS-REFERENCE TO RELATED APPLICATION

The present application is a continuation of International Application PCT/EP2006/000836, which was filed Feb. 1, 2006. The entire disclosure of International Application PCT/EP2006/000836, which was filed Feb. 1, 2006, is incorporated herein by reference.

BACKGROUND OF THE INVENTION

The present invention relates to a method for assembling a crash-active head support of a vehicle seat, wherein the structure of the head support is initially assembled and then upholstered.

In a known method of the type described immediately above, the structure of the head support is assembled from a great number of individual parts. Therefore, there is a high cost, and a risk of assembly errors when the assembling of the structure is carried out manually. For mass production, it is desirable to reduce the cost and the risk of errors.

BRIEF SUMMARY OF SOME ASPECTS OF THE INVENTION

An aspect of the present invention is the provision of improvements to a method of the type described above. In accordance with one aspect of the present invention, in a method for assembling a crash-active head support of a vehicle seat, a structure of the head support is initially assembled and then upholstered, wherein the assembling of the structure of the head support includes pre-equipping a rear bearing shell and a front bearing shell with respective components, and then connecting the pre-equipped rear bearing shell and the pre-equipped front bearing shell to one another so that the pre-equipped rear bearing shell and the pre-equipped front bearing shell are rigidly connected to one another.

Because a rear bearing shell and a front bearing shell are pre-equipped with components and then the pre-equipped bearing shells are rigidly connected to one another, pre-equipped components may be used which are able to be put into (e.g., onto) the bearing shells at their required positions and then able to be fixed by connecting the bearing shells which also implies that these components are pivotable and/or displaceable relative to the bearing shells. Such components may be a head support bracket, a double arm spring, a lower pivotable unit or a trigger unit.

When pre-equipped (e.g., during the pre-equipping), the bearing shells preferably at least partially receive the components or pins attached thereto in recesses, bearings and other receivers, i.e. in particular entirely or halfway and, namely, preferably on the sides of the bearing shells facing one another. For receivers that only partially receive a component, there may be counterpart receivers on the other bearing shell, so that when connecting the two bearing shells the aforementioned receivers and the counterpart receivers are combined into closed formations.

The pre-equipped bearing shells may preferably be placed pivotably onto one another—or hooked behind on one side—and pivoted (e.g., folded) onto one another. An impact element is preferably hinged thereto, in particular by way of the double arm spring and lower pivotable unit, whereby the structure of the head support is assembled.

Other aspects and advantages of the present invention will become apparent from the following.

BRIEF DESCRIPTION OF THE DRAWINGS

The invention is described in more detail below with reference to an embodiment shown in the drawings listed below.

FIG. 2 shows a view of the rear face of the pre-equipped front bearing shell.

FIG. 3 shows a view of the front face of the pre-equipped rear bearing shell.

DETAILED DESCRIPTION OF AN EMBODIMENT

Figure 1:
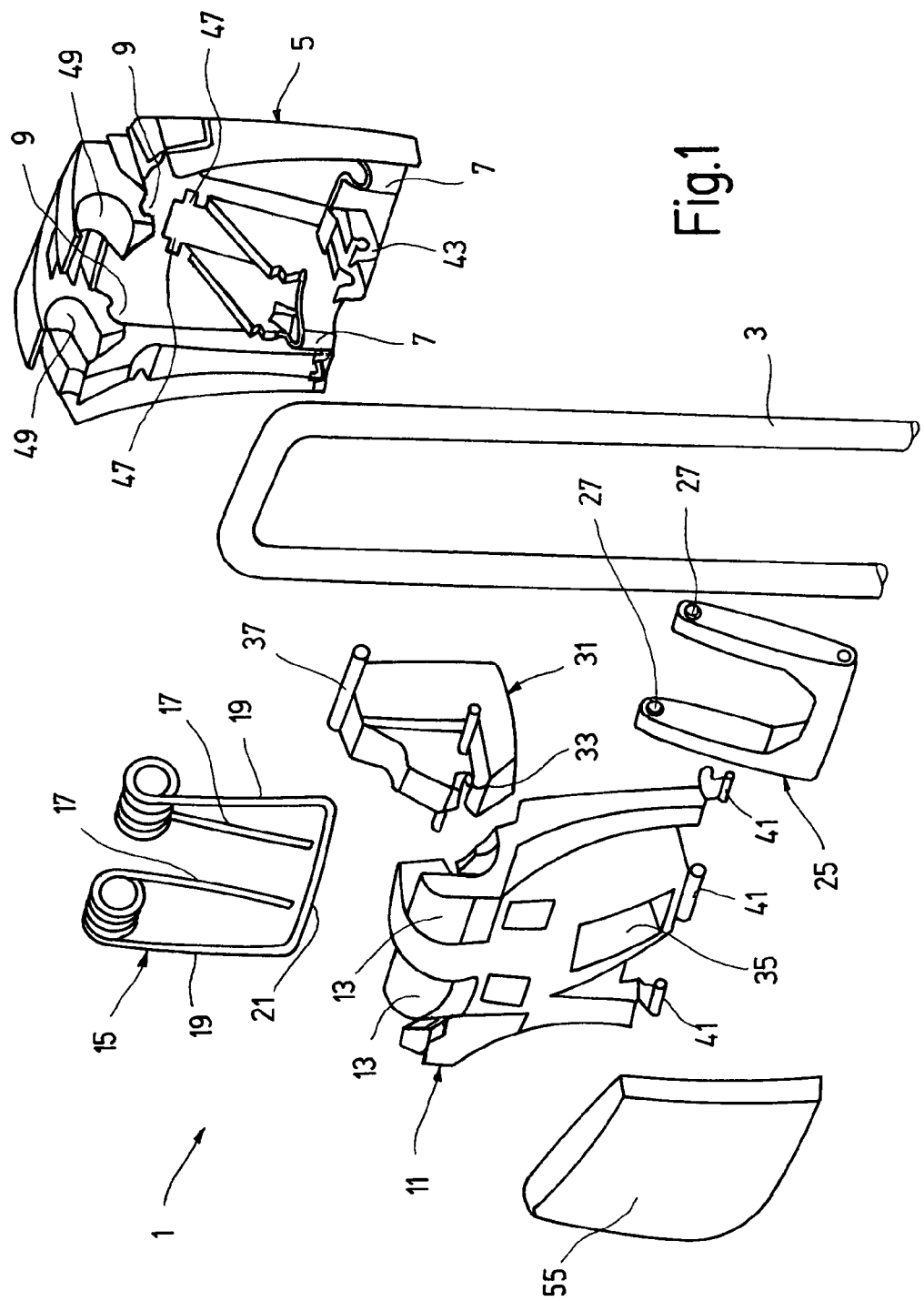
FIG. 1 shows an exploded view of the components of the head support without upholstery.

A crash-active head support 1 is provided for a vehicle seat. The alignment of the head support 1 in a vehicle and the usual direction of travel thereof define the directional information used. For assembling the head support 1, a rear bearing shell 5 is placed with its front face onto a U-shaped, bent head support bracket 3. The rear bearing shell 5 receives the head support bracket 3 on its two parallel arms by way of respective rearwardly open lower bracket receivers 7 and on its central portion by way of two downwardly open upper bracket receivers 9. The rear bearing shell 5 is thus pre-equipped with the head support bracket 3.

A front bearing shell 11 becomes pre-equipped by receiving other components. On the rear face of the front bearing shell 11, the wound portions of a double arm spring 15 are inserted halfway into two rearwardly open front spring receivers 13. In this regard, the free support arms 17, which project from the ends facing one another, are brought to rest on the rear face of the front bearing shell 11; and the drive arms 19, which project from the ends facing away from one another and are connected to one another by way of a transverse arm 21, are brought to rest on the front face of the front bearing shell 11.

A lower pivotable unit 25 (e.g., lower rocker unit) has a U-shaped configuration. Horizontally arranged bearing pins 27 (e.g., lower rocker bearing pins) are respectively formed on the two free ends of the lower pivotable unit 25. The front bearing shell 11 includes front bearing pin receivers 29 (e.g., front rocker bearing pin receivers). The bearing pins 27 are received halfway by the front bearing pin receivers 29, respectively, so that the front bearing shell 11 supports lower pivotable unit 25.

A trigger unit 31 comprises a movable hook mouth 33, which is for receiving the transverse arm 21, and an associated triggering mechanism with a magnet. The trigger unit 31 is inserted into a recess 35 of the front bearing shell 11, so that the hook mouth 33 is oriented toward the front. When the trigger unit 31 is inserted into the recess 35, ends of a trigger unit pin 37, which is formed on the rear upper edge of the two-part housing of the trigger unit 31 and projects to the sides, are respectively brought to rest halfway into front trigger unit pins receivers 39 of the front bearing shell 11.

Then, three horizontal, split bearing pins 41, which are aligned with one another and formed on the lower edge of the front bearing shell 11, are respectively inserted into three suitable split bearings 43 that are configured on the lower edge of the rear bearing shell 5 and are open upwardly. Then the pre-equipped front bearing shell 11 is pivoted around the split bearing pins 41 onto the similarly pre-equipped rear bearing shell 5. As a result, the rear halves of the bearing pins 27, which are still free, respectively enter rear bearing pin receivers 45 (which serve as parts of bearings) of the rear bearing shell 5; rear halves of the ends of the trigger unit pin 37 respectively enter rear trigger unit pin receivers 47 of the rear bearing shell 5; and the wound portions of the double arm spring 15 respectively enter rear spring receivers 49 of the rear bearing shell 5. Subsequently, the front and the rear bearing shells 11 and 5 are screwed to one another in the upper region at three front screw points 51 and three rear screw points 53 aligned therewith. The individual components are now rigidly connected to one another or are movable relative to one another with the necessary play.

Figure 4:
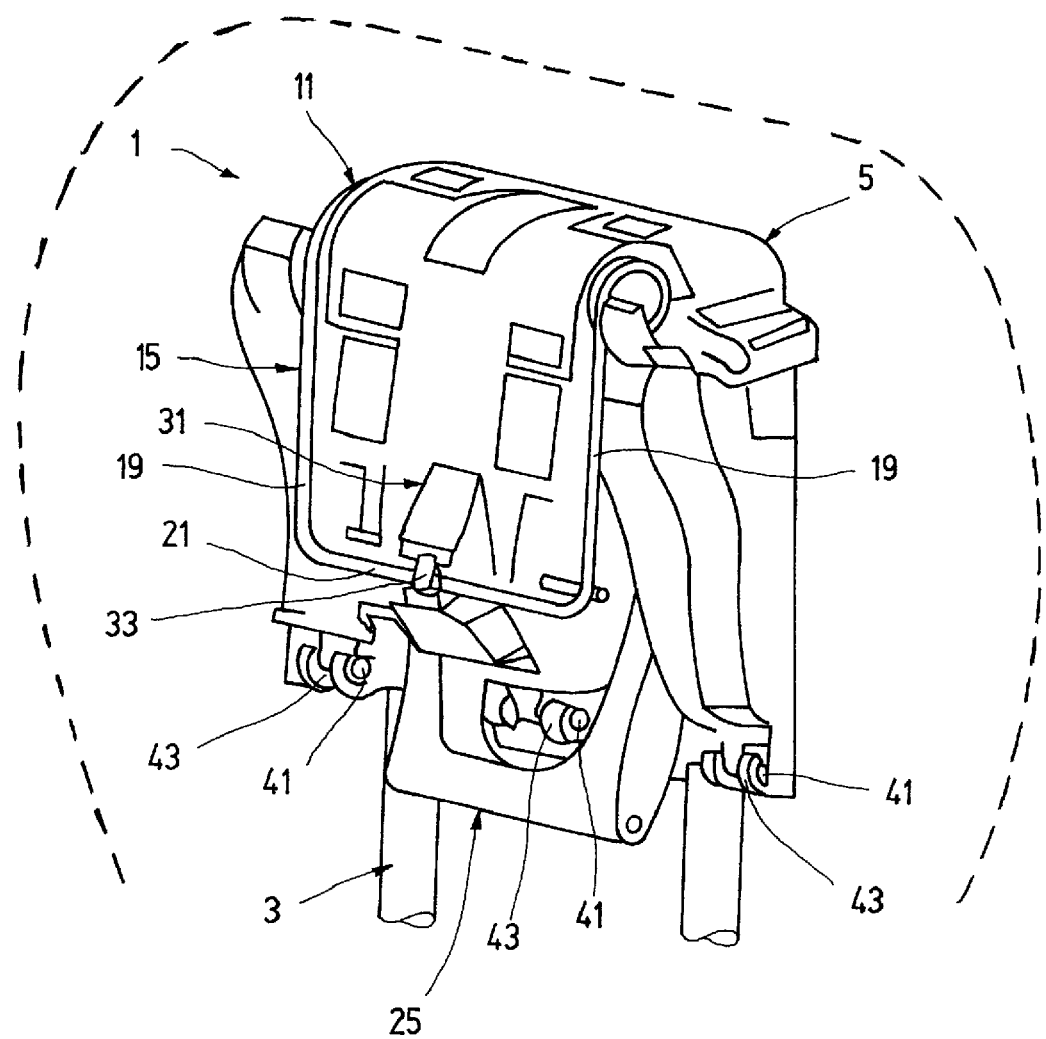
FIG. 4 shows a perspective view of the bearing shells connected to one another.

A plate-shaped impact element 55 is now hingedly suspended (e.g., pivotably mounted), on the one hand, on the transverse arm 21 of the double arm spring 15 and, on the other hand, on the lower end of the lower pivotable unit 25. The transverse arm 21 is inserted by pretensioning into the hook mouth 33 of the trigger unit 31 and locked there. The structure of the head support 1 which includes all the disclosed components, is thus completely assembled. Finally, the structure is upholstered, whereby the head support 1 is complete. The dashed lines in FIG. 4 schematically illustrate the upholstery.

In normal conditions, the head support 1 forms a compact unit. In the event of a crash, the trigger unit 31 is triggered by crash sensors, so that the transverse arm 21 is released. The impact element 55, which is hinged on the bearing shells 5 and 11, by way of the drive arm 19 and the lower pivotable unit 25 by forming a four bar linkage, now extends—driven by the double arm spring 15—into a position arranged closer to the head in order to cushion the head in good time.

It will be understood by those skilled in the art that while the present invention has been discussed above with reference to an embodiment, various additions, modifications and changes can be made thereto without departing from the spirit and scope of the invention as set forth in the following claims.

The invention claimed is:

1. A method for assembling a crash-active head support for a vehicle seat, the method comprising:
    assembling structure of the head support, comprising
        (a) pre-equipping a rear bearing shell and a front bearing shell with respective components,
        (b) thereafter connecting the pre-equipped rear bearing shell and the pre-equipped front bearing shell to one another so that the pre-equipped rear bearing shell and the pre-equipped front bearing shell are rigidly connected to one another, and
        (c) thereafter pivotably mounting an impact element to the pre-equipped bearing shells; and
    thereafter upholstering the structure of the head support.

2. The method as claimed in claim 1, wherein the step of pre-equipping comprises:
    a head support bracket being received by only the rear bearing shell; and
    at least one of the components being received by only the front bearing shell, wherein the at least one of the components is selected from the group consisting of a double arm spring, a lower pivotable unit and a trigger unit.

3. The method as claimed in claim 2, wherein the pivotably mounting step comprises pivotably mounting the impact element to both the double arm spring and the lower pivotable unit.

4. The method as claimed in claim 1, wherein the step of pre-equipping comprises:
    a head support bracket being received by only the rear bearing shell; and
    at least two of the components being received by only the front bearing shell, wherein the at least two of the components are selected from the group consisting of a double arm spring, a lower pivotable unit and a trigger unit.

5. The method as claimed in claim 4, wherein the pivotably mounting step comprises pivotably mounting the impact element to both the double arm spring and the lower pivotable unit.

6. The method as claimed in claim 1, wherein the step of pre-equipping comprises a head support bracket being received by only one of the two bearing shells.

7. The method as claimed in claim 1, wherein the step of pre-equipping comprises a double arm spring being received by only one of the two bearing shells.

8. The method as claimed in claim 1, wherein the step of pre-equipping comprises a lower pivotable unit being received by only one of the two bearing shells.

9. The method as claimed in claim 1, wherein the step of pre-equipping comprises a trigger unit being received by only one of the two bearing shells.

10. The method as claimed in claim 1, wherein:
    the step of pre-equipping comprises the bearing shells at least partially receiving respective elements in respective receivers,
    the elements are selected from the group consisting of the components and pins attached to the components, and
    the receivers are selected from the group consisting of recesses and bearings.

11. The method as claimed in claim 1, wherein the connecting step comprises inserting bearing pins of one of the pre-equipped bearing shells respectively into bearings of the other pre-equipped bearing shell.

12. The method as claimed in claim 1, wherein the connecting step comprises causing relative pivoting between the pre-equipped bearing shells.

13. The method as claimed in claim claim 1, wherein:
    the step of pre-equipping comprises
        (a) a double arm spring being received by one of the two bearing shells, and
        (b) a lower pivotable unit being received by one of the two bearing shells; and
    the pivotably mounting step comprises pivotably mounting the impact element to both the double arm spring and the lower pivotable unit.

14. A method for assembling a crash-active head support for a vehicle seat, the method comprising:
    assembling structure of the head support, comprising
        (a) pre-equipping a rear bearing shell and a front bearing shell with respective components so that
            (1) a head support bracket is received by only the rear bearing shell, and
            (2) at least one of the components is received by only the front bearing shell, wherein the at least one of the components is selected from the group consisting of a double arm spring, a lower pivotable unit and a trigger unit,
        (b) thereafter connecting the pre-equipped rear bearing shell and the pre-equipped front bearing shell to one another so that
            (1) the at least one of the components is at least partially received by a receiver of the rear bearing shell, and
            (2) the pre-equipped rear bearing shell and the pre-equipped front bearing shell are rigidly connected to one another, and (c) thereafter pivotably mounting an impact element to the pre-equipped bearing shells, wherein the pivotably mounting step comprises pivotably mounting the impact element to the double arm spring; and
thereafter upholstering the structure of the head support.

15. The method as claimed in claim 14, wherein the pivotably mounting step comprises pivotably mounting the impact element to the lower pivotable unit.

* * * * *